__UNITED STATES PATENT OFFICE.__

ADOLF ERNST MENNE, OF CREUZTHAL, AND WILHELM ZOLLENKOPF, OF COLOGNE, GERMANY, ASSIGNORS TO CÖLN-MÜSENER BERGWERKS ACTIEN VEREIN, OF CREUZTHAL, GERMANY, A CORPORATION OF GERMANY.

METHOD OF MELTING THROUGH MASSES OF MATERIAL.

No. 866,498.     Specification of Letters Patent.     Patented Sept. 17, 1907.

Application filed August 27, 1906. Serial No. 332,303.

*To all whom it may concern:*

Be it known that we, ADOLF ERNST MENNE, doctor of philosophy, chemist, a subject of the German Emperor, and residing at No. 37 Provinziallandstrasse, in Creuzthal, Westphalia, Germany, and WILHELM ZOLLENKOPF, engineer, a subject of the German Emperor, and residing at Cologne, Germany, Deutscher Ring No. 11, have invented certain new and useful Improvements in Methods of Melting Through Masses of Material; and we do hereby declare the following to be a full, clear, and exact description of the invention, such as will enable others skilled in the art to which it appertains to make and use the same.

The present invention relates to a method of melting through masses of material which can be entirely or partly burned up by oxygen or similar oxidizing gases or mixture of gases, after said masses have been brought in any way to the necessary temperature.

The U. S. patent to Hermann A. E. Menne, No. 703,940 granted July 1, 1902, already relates to a method by which masses are heated with the oxyhydrogen flame and then entirely or partly burned up with oxygen under pressure. According to the present method the heating of the masses of material takes place otherwise, particularly by the heat from contact with an electric shortcircuit or by the electric arc.

The method according to the present invention may be carried out as follows:—A steel plate for example, say armor-plate, 10 inches thick is to have a hole made through it. The one pole of a circuit supplying electric current is connected with the armor-plate, and the other pole is connected with an electrically conducting pipe through which oxygen is blown. Now if the armor plate is contacted by the pipe and if oxygen is simultaneously blown through said pipe, only a flash of the short-circuit spark takes place, but the heat suffices for commencing the fusing and the oxygen perforates the plate in the fraction of a minute. It is here not a question of electric melting, or of a supply of oxygen to the electric arc; the action of the heating by the heat generated electrically and the melting through by means of the current of oxygen take place in point of time one after the other, as the current of oxygen indeed blows out the electric arc, or does not even allow it to form at all.

While in the manner described the electricity acts only for a fraction of a second, it may also be arranged that the electric arc is allowed to act for some seconds at the place to be melted, and only then to allow a blast of oxygen to play on the heated place, whereby the electric arc is of course destroyed. In this case a weaker strength of electric current is required than with the short-circuit.

The method is particularly for use in melting holes in armor plate, for forming blast-holes, for dismounting masses of iron and steel, and the like. Also it might be used under some circumstances for opening tap-holes in blast-furnaces.

While we have described in the foregoing specification the operations preferred, we are aware that numerous changes of operation may be made without departing from the spirit and scope of our invention, and we therefore do not wish to be understood as limiting ourselves by the positive terms employed in connection with the description, excepting such as the state of the art may require.

What we claim as our invention and desire to secure by Letters Patent is:

1. A method of melting through masses of metal and masses containing combustible parts, consisting in temporarily heating the part of said mass to be melted by first passing and then extinguishing an electric arc and in thereafter supplying gases containing oxygen to said heated part, substantially as described.

2. A method of melting through masses of metal and masses containing combustible parts, consisting in first heating by means of an arc the part of said mass to be melted then extinguishing the same after a brief interval and in thereafter supplying oxygen to said heated part until the required perforation is accomplished, substantially as described.

3. A method of melting through masses of metal and masses containing combustible parts, consisting in first electrically heating the part of said mass to be melted for some seconds and in then cutting off the heating means and supplying gases containing oxygen to said heated part until the required perforation is secured, substantially as described.

4. A method of melting through masses of armor plate and masses containing combustible parts, consisting in electrically heating for a brief time only the part of said mass to be melted by applying and at once cutting off the source of heat and in then supplying oxygen to said heated part and permitting the same to ignite and burn away the metal until the required perforation is secured, substantially as described.

5. A method of melting through masses of metal and masses containing combustible parts, consisting in forming an electric arc for a brief interval only at the part to be melted thereby, heating the said part and in supplying gases containing oxygen to said heated part, thereby extinguishing said arc and burning away the metal, substantially as described.

6. The method of perforating masses of metal and masses containing combustible parts, which consists in providing a pipe in an electric circuit, forming an arc between the said pipe and the said mass and extinguishing the same after a brief interval of time only, and thereby locally heating the said mass, and then passing gases containing oxygen through said pipe to the part heated until the required hole is produced, substantially as described.

7. The method of perforating masses of metal and masses containing combustible parts, which consists in providing a pipe in an electric circuit, contacting the same with the said mass, and then withdrawing the same to form an electric arc, permitting the arc to play for a brief interval of time only, and then admitting gases containing oxygen to said pipe, and blowing out said arc, and burning out the required perforation in said mass, substantially as described.

In testimony whereof, we affix our signatures, in presence of two witnesses.

ADOLF ERNST MENNE.
WILHELM ZOLLENKOPF.

Witnesses:
BESSIE F. DUNLAP,
LOUIS VANDORY.